Figure 4:
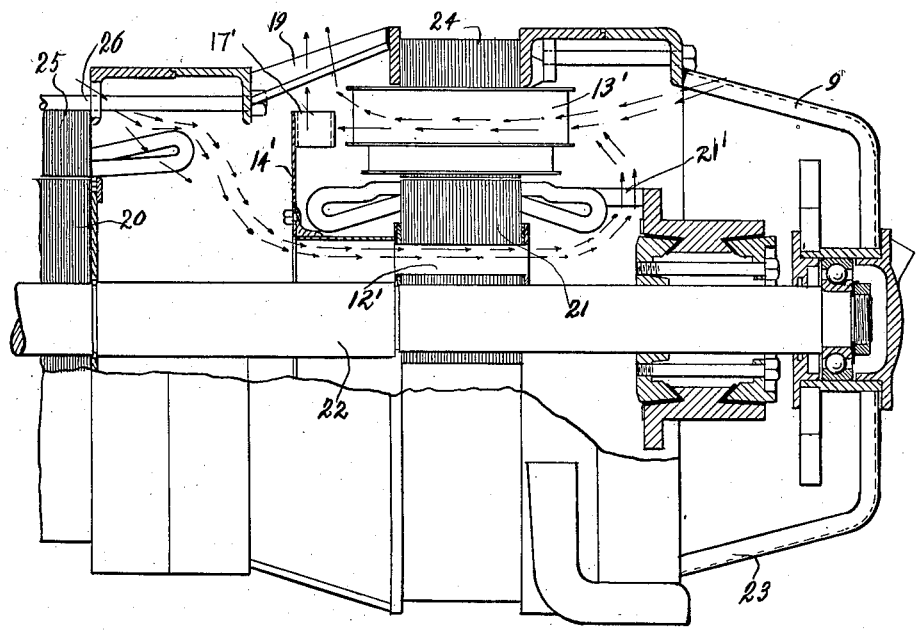

Dec. 9, 1930.  J. F. LINCOLN ET AL  1,784,102
DYNAMO ELECTRIC MACHINE
Filed July 20, 1927   2 Sheets-Sheet 1
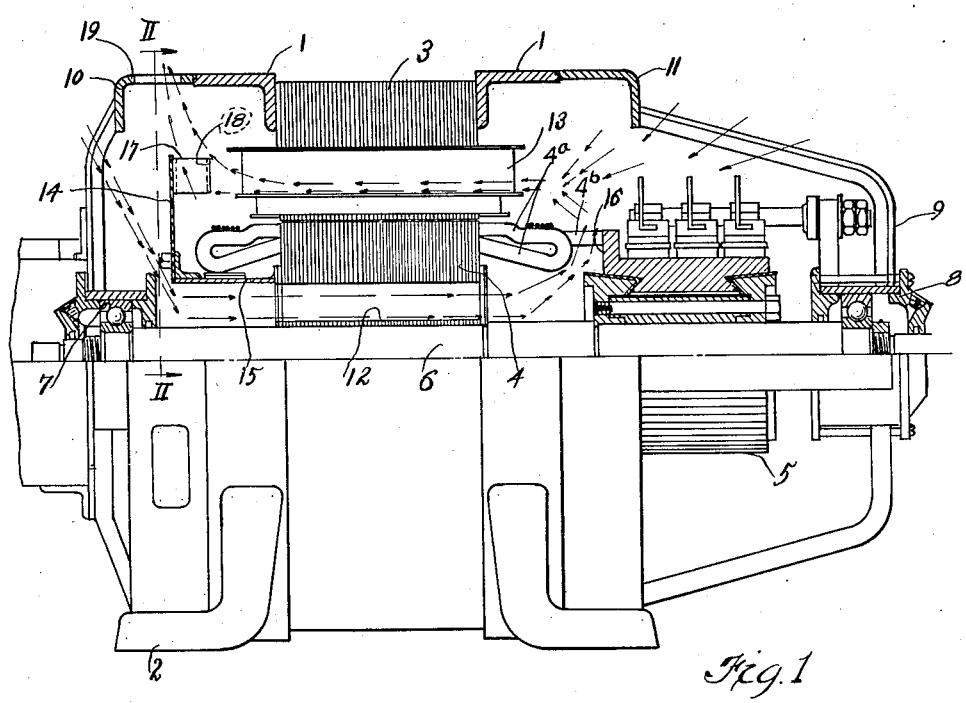
Fig.1
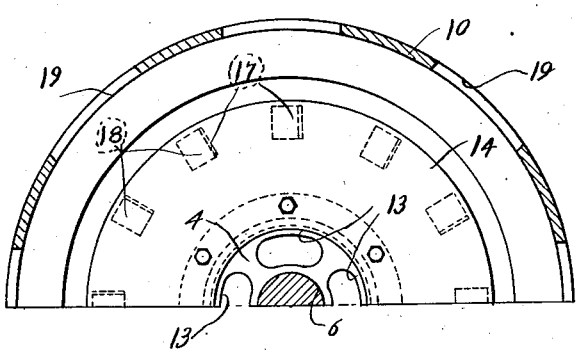
Fig.2
Fig.3
INVENTORS
James F. Lincoln and
BY Erwin E. Dreese
Fay, Oberlin & Fay
ATTORNEYS

UNITED STATES PATENT OFFICE

JAMES F. LINCOLN, OF EAST CLEVELAND, AND ERWIN E. DREESE, OF EUCLID, OHIO, ASSIGNORS TO THE LINCOLN ELECTRIC COMPANY, OF CLEVELAND, OHIO, A CORPORATION OF OHIO

DYNAMO-ELECTRIC MACHINE

Application filed July 20, 1927. Serial No. 207,072.

This invention relates to dynamo-electric machines, as motors, generators, etc., and it is among the objects of the invention to provide an improved construction and arrangement of moving and stationary parts, having among other results, a reduction of tendencies to overheating. Other objects and advantages will appear as the description proceeds.

To the accomplishment of the foregoing and related ends, the invention, then, consists of the features hereinafter fully described and particularly pointed out in the claims, the following description and the annexed drawings setting forth in detail certain structures embodying the invention, such being illustrative however of but a few of various forms in which the principle of the invention may be employed.

In said annexed drawings:—

Fig. 1 is a side elevational view partly in section, showing an embodiment of the invention; Fig. 2 is a section taken on a plane indicated by the line II—II, Fig. 1; Fig. 3 is a detail in plan view; and Fig. 4 is a view similar to Fig. 1, showing a modification.

Referring more particularly to the drawings, the frame 1 is of typical construction, having anchoring feet 2, and supporting a stator 3. A rotor 4 and commutator or collector device 5 as the case may be, are carried on a shaft 6, the latter being mounted in bearings 7, 8, in spider brackets including legs 9, which converge from extensions of the end rings 10, 11. Axially arranged in the rotor are passways 12, and similarly axially arranged in the stator are air passways 13, these being actually the spaces normally occurring between the series of pole windings. Preferably the air supply for these passways is systematically divided, such that the air inlet for the rotor is at one end, and the air inlet for the stator is at the opposite end. The advantages of the invention however, may be realized in proportionate degree irrespective of this particular current feed.

For preventing undesired mingling of currents and formation of eddies, a deflector 14 is preferably arranged at the inlet end for the rotor passways, and such deflector may advantageously take the form of an annular member carried on a sleeve 15 of tubular character, secured to the rotor. Air currents are thus free to enter at the coresponding end of the machine, and pass into the ducts 12. At the other end of the rotor, exit is had through or between the armature leads, the backwall 16 of the commutator standing as a directing surface whereby air currents are turned outwardly. The projecting portions 4ª of the rotor winding, and more particularly the leads 4ᵇ therefrom to the commutator, are arranged and designed to act as blower vanes, i. e., provide the impelling force which draws the air through the openings 12 in the rotor 4.

At this end also air-inlet between the legs 9 of the spider provides a further air supply for the passways between the pole windings 13 of the stator, thereby mitigating the effect of the air slightly raised in temperature by its passage through the rotor, and which must be handled in such a manner as to prevent interference with the incoming currents. Moreover, an improved circulation and accelerated effect may be had by introducing the stator supply such as to act directly.

At the deflector end, means are arranged for accelerating the air flow, or exhausting the air through the passways 13 between the poles of the stator. Preferably for this purpose the inside face of the deflector 14 is provided with scoop-blades, whereby the air is thrown peripherally, somewhat in the manner of a centrifugal exhaustor. These scoop-blades may vary somewhat in form, a desirable arrangement however, embodying plates 17 secured to the deflector 14. Ordinarily a radial placement is most desirable; the aligning, however, can be other than radial where preferred. In order to minimize eddies, it is further desirable to provide each blade-plate 17 with a forwardly directed flange 18. Peripherally arranged in the adjacent end-ring 10 outside of the scoop-blade assembly, are escape ports 19.

As will be readily seen from the foregoing, with the rotor in motion, and the leads 4ᵇ in action, air is drawn in through the left-hand end of the machine, and into and through the air passways 12 in the rotor, thence striking the back of the commutator 16, effecting the cooling of all these structures encountered; thence with additional air admitted beyond the commutator, being drawn through the passways 13 of the stator, the scoop-blades 17 hurling the air peripherally in its exit course out through the ports 19. In this manner for given volumes of air, a rapid circulation and thorough contacting with portions subject to heat generation is secured, with a minimum of interference with the best design from the electrical standpoint.

In the form shown in Fig. 4, a type of arrangement particularly suitable with shafts carrying more than one rotor is shown; for instance, the two rotors 20, 21 mounted on the shaft 22 shown as supported in bearings in the frame 23, the latter carrying stators 24, 25. Air inlet for the individual units is again had at an endwise location, ports 26 for instance allowing flow in past deflector 14′, and into the rotor passways 12′, thence up through the armature leads 21′. Additional air inlet is had between the spider-legs 9, and proceeding through the stator passways 13′ is hurled peripherally through the outlet ports 19′ arranged peripheral-wise of the scoop-blade assembly. A similar passway system may be applied to both units of the motor generator if desired; ordinarily however such arrangement for the motor end being sufficient though.

As thus seen, an especially thorough aeration and cooling of the more inaccessible portions of the machine, such as ordinarily are insufficiently cooled, is thus had, and at the same time without interfering with efficient design as effects the electrical output; in fact, with such arrangement, the electrical efficiency is improved.

Other modes of applying the principle of the invention may be employed, change being made as regards the details disclosed, provided the means stated in any of the following claims, or the equivalent of such, be employed.

We therefore particularly point out and distinctly claim as our invention:—

1. In apparatus of the character described, a frame; a stationary member having windings, in said frame; a rotatable member having windings, within said stationary member; air-passways axially arranged in both said members; an air inlet at the relatively cooler end of the machine to provide air to the passways of the rotatable member; means at the other end thereof for drawing the air through such passways; an air inlet for the stationary member passways above said means; means at the other end of the stationary member air-passways for drawing air therethrough; and an outlet beyond said last-named means.

2. In apparatus of the character described, the combination of a frame; a stationary member having windings, in said frame; a rotatable member having windings, within said stationary member; air-passways axially arranged in both said members; an air inlet at the relatively cooler end of the rotatable passways to supply air thereto; projections from the winding of said rotatable member at its opposite end to draw air through the passways thereof; an air inlet at the same end for admitting additional air to the stationary member air-passways; fan blades at the other end of said stationary member air-passways for drawing air therethrough; and an air outlet therebeyond.

3. In apparatus of the character described, a frame; a stationary member having windings, in said frame; a rotatable member having windings, within said stationary member; air-passways axially arranged in both said members; a deflector rotatable with the rotatable member; an air inlet for supplying air to the relatively cooler end of the rotatable air-passways; projections at the opposite end of said rotatable air-passways for drawing the air therethrough; an inlet for additional air at the adjacent end of said stationary member air-passways; scoop-blades at the opposite end of said stationary air-passways for drawing air therethrough; and peripheral escape-ports opposite said scoop-blades.

4. In apparatus of the character described, a frame; a stationary member having windings, in said frame; a rotatable member having windings, within said stationary member; air-passways axially arranged in both said members; an air inlet at one end of the rotatable air passways; a deflector about such air-inlet; projections at the opposite end of said rotatable air-passways for drawing air therethrough; an air inlet at the same end for supplying additional air to the stationary air-passways; radial blades at the opposite end of said stationary member air-passways, said blades being positioned on the inside of said deflector for centrifugal-type action; and escape ports in the peripheral path thereof.

Signed by us this 7th day of July, 1927.

JAMES F. LINCOLN.
ERWIN E. DREESE.